(12) United States Patent
Perry

(10) Patent No.: US 7,055,318 B2
(45) Date of Patent: Jun. 6, 2006

(54) DRIVE MECHANISM

(75) Inventor: Graham William Perry, Edinburgh (GB)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/496,369

(22) PCT Filed: Nov. 26, 2002

(86) PCT No.: PCT/DE02/04334

§ 371 (c)(1),
(2), (4) Date: Jul. 23, 2004

(87) PCT Pub. No.: WO03/048587

PCT Pub. Date: Jun. 12, 2003

(65) Prior Publication Data

US 2005/0031460 A1 Feb. 10, 2005

(30) Foreign Application Priority Data

Nov. 28, 2001 (DE) ............................. 101 58 212
Feb. 22, 2002 (DE) ............................. 102 07 749

(51) Int. Cl.
*F16D 31/02* (2006.01)
(52) U.S. Cl. .......................................... 60/426; 60/466
(58) Field of Classification Search ................ 60/426, 60/436, 442, 46, 484
See application file for complete search history.

(56) References Cited

U.S. PATENT DOCUMENTS

| 4,244,276 A | * | 1/1981 | Iwata ........................... 60/436 |
| 4,769,991 A | * | 9/1988 | Johnson ....................... 60/426 |
| 5,158,150 A | | 10/1992 | Askeland et al. |
| 5,167,291 A | | 12/1992 | Mann |
| 5,201,570 A | | 4/1993 | Heren et al. |
| 5,857,330 A | * | 1/1999 | Ishizaki et al. ............... 60/426 |
| 6,314,728 B1 | * | 11/2001 | Schilling et al. .............. 60/436 |

FOREIGN PATENT DOCUMENTS

| DE | 2118936 | 2/1973 |
| DE | 36 34 728 A1 | 4/1988 |
| DE | 38 44 405 A1 | 7/1990 |
| DE | 195 31 497 A1 | 2/1997 |
| DE | 100 17 901 A1 | 12/2000 |
| DE | 199 30 425 A1 | 1/2001 |

\* cited by examiner

*Primary Examiner*—Edward K. Look
*Assistant Examiner*—Michael Leslie
(74) *Attorney, Agent, or Firm*—Oliff & Berridge, PLC

(57) ABSTRACT

A drive mechanism is disclosed which includes a hydraulic pump whereby at least two hydraulic motors may be supplied with pressure medium. The drive mechanism in accordance with the invention has on the meter-in side or on the meter-out side of each hydraulic motor a variable hydraulic resistor that is biased into a basic position of minimum open cross-section and may be subjected to a control pressure in a direction of increased open cross-section. This control pressure is dependent on the pressure on the meter-in side or on the meter-out side of the hydraulic motor.

10 Claims, 6 Drawing Sheets

DRIVE MECHANISM

BACKGROUND

The invention concerns a drive mechanism including a hydraulic pump whereby at least two hydraulic motors may be supplied with pressure medium.

SUMMARY

Such drive mechanisms are used, for instance, for hydraulic drive systems, in particular for hydrostatic traveling mechanisms. In such cases a plurality of hydraulic motors arranged, e.g., at the wheels of a vehicle, are driven through the intermediary of a single pump. In order to be able to provide high torques, the motors should be coupled in parallel, so that all of them may be operated at full system pressure. It may, however, happen in such systems that in the event of highly different load conditions existing at the motors, the one motor having the lowest load is accelerated while the other motors are decelerated accordingly. In hydrostatic traveling mechanisms such a problem occurs when the traction at one driven wheel is reduced, with this wheel accordingly spinning. As a result of the increase in the wheel speed, the associated motor is accelerated, so that practically the entire pressure medium flow rate is routed via this motor, and the vehicle comes to a standstill as a result of the slipping wheel. As a result of such slip, damages to the ground, to the tyre, and to the automotive bearings may occur.

DE 195 31 497 A1 discloses a traveling mechanism wherein a respective stationary metering orifice and a pressure compensation element arranged upstream or downstream—depending on the direction of flow—are provided in the pressure medium flow path between the hydraulic pump and the single hydraulic motors. This pressure compensation element is on the one hand subjected to the pressure in a section of pressure line between the metering orifice and the pressure compensation element, and on the other hand to a pilot pressure corresponding to the lowest or highest pressure at the consumers. In the case of a slip of a hydraulic motor, the corresponding meter-in or meter-in pressure compensation element is taken into a throttling position, so that the pressure medium flow rate does not change at the hydraulic motor subjected to slip.

This hydrostatic traveling mechanism has the drawback that a metering orifice having a constant cross-section of flow and a pressure compensation element have to be associated to each hydraulic motor, with the expense in terms of device technology accordingly being considerable.

DE 199 30 425 A1 discloses a hydrostatic traveling mechanism wherein the hydraulic motors are successively coupled in series. To both hydraulic motors a respective on-off valve is associated, whereby in the event of a slip at a hydraulic motor the pressure medium flow is bypassed to the other hydraulic motor. For the case that the slip of this hydraulic motor should be limited, too, one on-off valve each will be associated to both motors, so that a considerable expense in terms of device technology is necessary in this solution, as well.

DE 100 17 901 A1 discloses a hydrostatic traveling mechanism comprising two hydraulic motors, each of which has a secondary motor associated to it. These two secondary motors may be supplied with pressure medium through the intermediary of a secondary circuit, so that in the case of a slip between the drive trains a sufficient pressure medium supply to both drive trains is ensured. This solution can only be realized with considerable expense in terms of device and control technology.

In contrast, the invention is based on the objective of furnishing a drive mechanism wherein the slip at a hydraulic motor may be compensated at minimum expense.

This objective is attained through a drive mechanism having the features of claim 1.

In accordance with the invention, a flow valve is associated to each one of the hydraulic motors associated to a hydraulic pump, which flow valve has a minimum open cross-section in its basic position and may be subjected to a control pressure in a direction of increased open cross-section. This control pressure is tapped on the meter-in side or on meter-out side of the associated hydraulic motor. This flow valve thus has the form of a variable hydraulic resistor having minimum and maximum open cross-sections and may be arranged on the meter-in or meter-out side of the hydraulic motor. This hydraulic resistor has a minimum hydraulic resistance particularly in its position of maximum open cross-section, so that the pressure loss across the flow valve is low. In accordance with the invention it is preferred if control lines of the variable hydraulic resistors conducting the control pressure are interconnected via a common pilot line, so that practically all flow valves are subjected to a same control pressure, i.e., a pilot pressure, in one direction. This pilot pressure may, depending on the circuit type, be the lowest pressure on the meter-out side of the hydraulic motors, the highest pressure on the meter-in side of the hydraulic motors, or in turn an intermediate pressure. As a function of this pilot pressure the variable hydraulic resistors respectively associated to the hydraulic motors are each taken into a position of through flow, where in the event of an excessive pressure medium flow rate caused, e.g., by slip at one hydraulic motor, this pressure medium flow is throttled, the hydraulic motor in question is decelerated, and the slip is reduced, so that a correct operation of the system is ensured.

In a particularly advantageous variant of the invention, a check valve is associated to each one of the control lines, which check valve opens in such a way that the pressure in the pilot line approximately corresponds to the control pressure at the hydraulic motor having the lowest pressure medium flow rate. In other words, in this advantageous development the flow opening of the hydraulic resistor is set in accordance with this lowest pressure medium flow rate.

As was already mentioned above, the variable hydraulic resistor optionally having the form, e.g., of a throttle valve, may be arranged on the meter-out side or on the meter-in side of a hydraulic motor. In the former case, the variable hydraulic resistor is acted on by a spring in the direction of the reduced cross-section and by the pilot pressure in the opposite direction, whereas in the latter case the spring and the pilot pressure act in the direction of the reduced cross-section and the pressure upstream from the variable resistor conversely acts in the direction of the increased cross-section.

In a preferred embodiment, damping throttles for attenuating vibrations of a valve body of the variable resistor are arranged in control lines.

In accordance with a development of the invention, one respective variable throttle means may be associated to the variable hydraulic resistors, so that throttling of the pressure medium flow additionally takes place through the intermediary of this throttle means. The further throttle means may be provided both on the meter-in side and on the meter-out side of the hydraulic motor.

The pilot pressure tapped via the pilot line may be employed for driving a brake acting on the hydraulic motor, so that the slip at this hydraulic motor may be reduced with the aid of the brake.

In another variant of the invention, a secondary engine may be driven by the hydraulic motor, whereby a control oil flow to the variable hydraulic resistor and from there back to the meter-out or meter-in line of the hydraulic motor is supplied. The effective control or pilot pressure for adjusting the variable hydraulic resistor is then generated through this secondary engine.

Further advantageous developments of the invention are the subject matters of the further subclaims.

BRIEF DESCRIPTION OF THE DRAWINGS

In the following, preferred practical examples of the invention shall be explained by referring to schematic drawings, wherein.

DETAILED DESCRIPTION OF EMBODIMENTS

Figure 1:
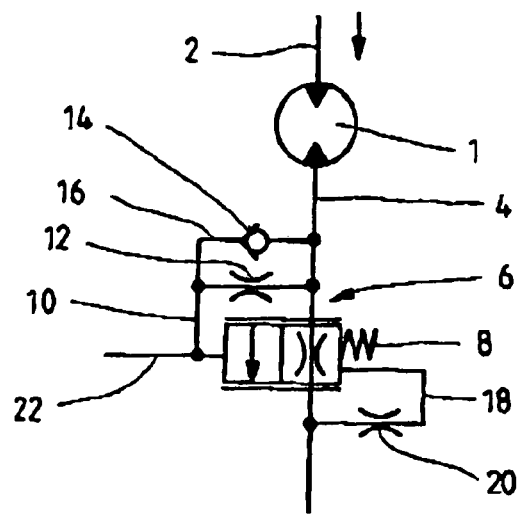
FIG. 1 shows a hydraulic circuit diagram of a basic component of a means in accordance with the invention, comprising a hydraulic motor and a variable hydraulic resistor arranged on the meter-out side.

FIG. 1 shows a schematic hydraulic circuit diagram of a basic component of a drive mechanism in accordance with the invention, which has the form of a hydrostatic traveling mechanism in the practical examples described hereinbelow. The drive mechanism includes a hydraulic pump (not shown) whereby several hydraulic motors 1 may be supplied with pressure medium in parallel. The latter is supplied to the hydraulic motor 1 via a meter-in 2 and returned via a meter-out 4 into a tank or to the pump. On the meter-out 4 side of the hydraulic motor 1 a variable hydraulic resistor 6 is arranged that is biased into a basic position by a spring 8. In this basic position the variable resistor has a minimum cross-section of flow. Under certain conditions it may even be advantageous if this cross-section of flow is closed in the basic position. The variable resistor 6 may be reduced through the intermediary of a control pressure that will be described in more detail hereinbelow, wherein the cross-section of flow is steadily increased up to a maximum diameter. This variable resistor 6 may be designed, e.g., as a flow valve, in particular a throttle valve having a variable cross-section.

A valve body of this variable resistor 6 is subjected to the pressure in a control line 10 in the opening direction (larger cross-section of flow). This control line 10 connects the control surface of the variable resistor 6, which acts in the direction of increasing open cross-section, with the low-pressure port of the hydraulic motor 1 (meter-out 4). Inside the control line 10 a throttle 12 is indicated. In parallel with this, a check valve 14 opening towards the meter-out line 4 is arranged in a branch control line 16. A control surface of the variable resistor 6 acting in the direction towards the spring 8 is connected with the portion of the meter-out 4 located downstream of the variable resistor 6 via a line 18 including a damping throttle 20, so that high-frequency movements of the valve body of the variable resistor 6 are attenuated. The pressure downstream from the variable resistor 6 is usually largely constant.

A pilot line 22 conducting a pilot pressure merges into the control line 10. For the case that the pressure in the pilot line 22 is higher than the pressure on the meter-out 4 side, the control oil may be withdrawn from the pilot line 22 via the check valve 14 to the meter-out 4 side. In a case where the pilot line 22 is shut off, the control pressure in the control line 10 acting in the opening direction of the variable resistor 6 is determined by the flow of the pressure medium through the resistor 6, and thus by the pressure drop across the resistor, wherein the pressure acting in the opening direction is tapped via the throttle 12 on the meter-out 4 side, and the force acting in the closing direction is determined by the force of the spring 8 and the pressure downstream from the resistor. In a static condition, the valve body of the hydraulic resistor 6 assumes a position in which the force generated by the control pressure acting in the opening direction is equal to the sum of the force of the spring 8 and the force generated by the control pressure acting in the closing direction.

Figure 2:
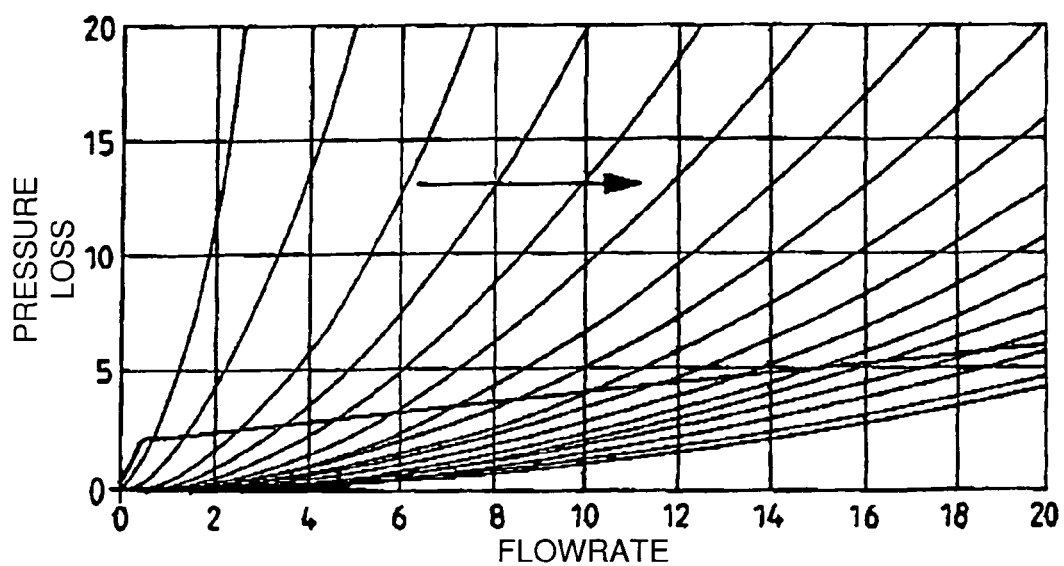
FIG. 2 shows a characteristic line of the variable hydraulic resistor of FIG. 2.

FIG. 2 shows characteristic lines of such a variable hydraulic resistor with the pressure loss plotted above the flow rate. The thin lines indicate the characteristic lines as a function of variously acting cross-sections of flow of a hydraulic resistor, with the effective cross-section of flow increasing in the direction of the arrow. In principle, these are the characteristic lines of a metering orifice having a respective constant cross-section.

The characteristic line of the variable hydraulic resistor 6 is represented by the bold line in FIG. 2. Accordingly, the characteristic line initially rises, similar to a constant cross-section, with an increasing flow. As soon as the pressure force acting in the opening direction exceeds the force of the spring 8 and the pressure force in the line 18, the effective cross-section of flow of the variable resistor 6 is increased, so that the nearly linear, comparatively flat shape of the characteristic line as represented in FIG. 2 manifests. This approximately linear rise of the characteristic line extends across the entire range in which the variable resistor 6 is opened from its minimum cross-section of flow to the maximum cross-section of flow. After reaching the maximum cross-section of flow and further rise of the flow rate, the variable resistor 6 has a characteristic line that rises in accordance with the thin lines in FIG. 2.

Figure 3:
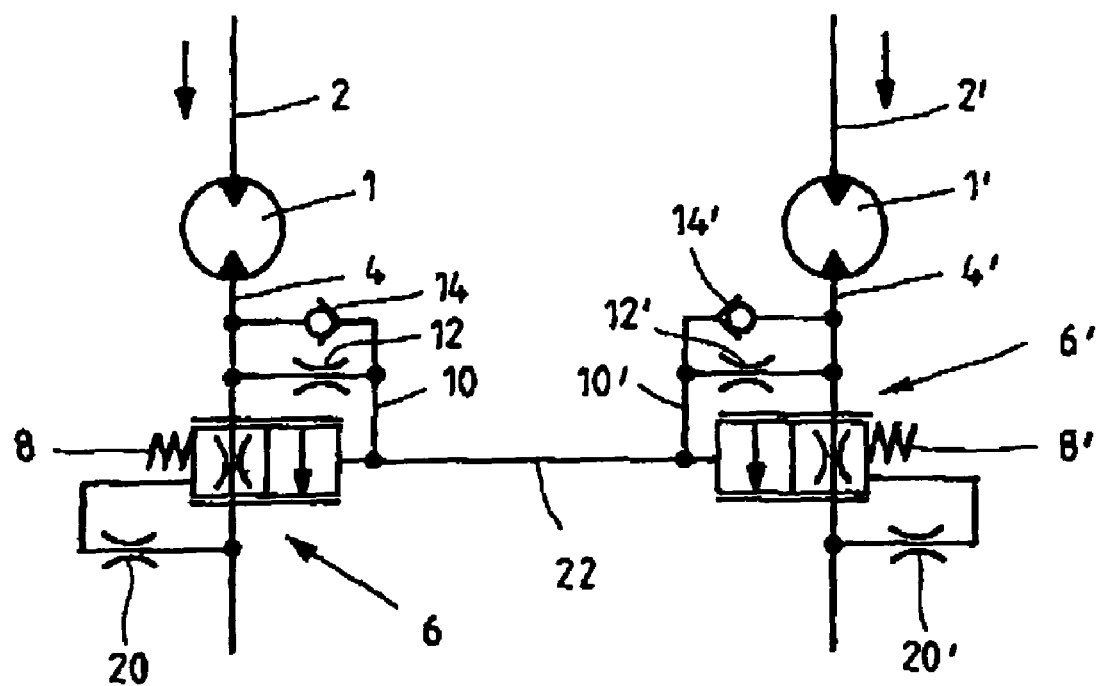
FIG. 3 shows a system of the basic components of FIG. 1 including two hydraulic motors that are subjected to identical pressure medium flows.

FIG. 3 shows a circuit for a traveling mechanism whereby e.g. a left wheel and a right wheel may be driven. For the sake of simplicity, the two branches are hereinbelow designated by the same reference symbols as in FIG. 1, wherein one branch is marked "'" for better distinction.

Accordingly, both hydraulic motors 1, 1' are supplied with pressure medium via a respective meter-in 2, 2' and a hydraulic pump (not shown). On the meter-out 4, 4' side of the hydraulic motors 1, 1' a respective variable resistor 6, 6' is arranged that is biased into its position of minimum cross-section of flow by a respective spring 8, 8'. In the opposite direction, the resistors 6, 6' are subjected to the pressure prevailing in a pilot line 22. The pilot line 22 is connected with two control lines 10, 10'. Between each control line 10, 10' and a meter-out 4, 4' a throttle 12, 12' and a check valve 14, 14' opening towards the meter-out side are arranged in parallel with each other. Now a case shall be assumed in which both hydraulic motors 1, 1' are subjected to an identical load, and thus an identical flow of pressure medium takes through them, i.e., the pressures on the meter-in side and on the meter-out side of the hydraulic motors 1, 1' are identical. Accordingly, the pressure losses across the variable resistors 6 in the branches are also identical, so that both resistors 6, 6' are taken into a position of identical cross-section of flow, in which the pressure loss across the variable hydraulic resistor 6, 6' is comparatively low. In other words, a pressure loss according to the characteristic line in FIG. 2 manifests as a function of the flow via the hydraulic motor 1, 1'.

Figure 4:
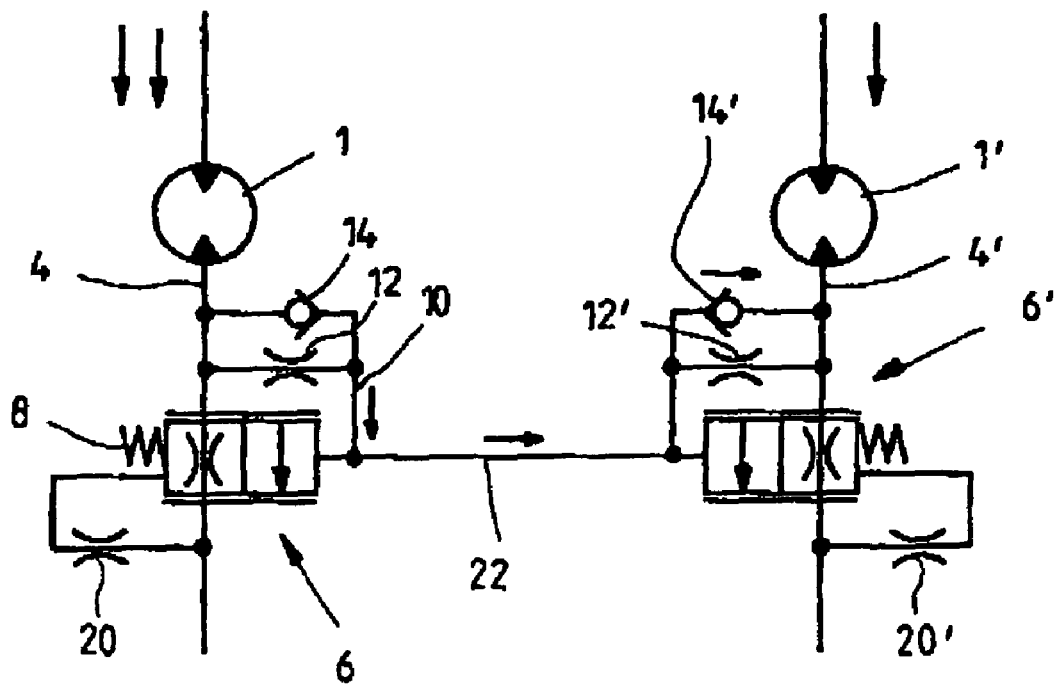
FIG. 4 shows the circuit diagram of FIG. 3 with different pressure medium flows.
Figure 5:
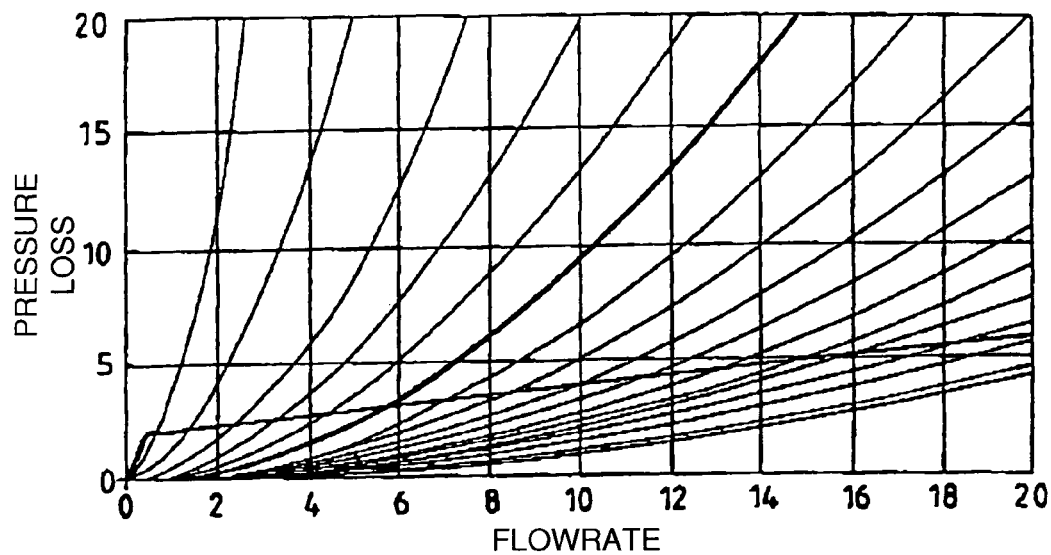
FIG. 5 shows the characteristic lines of the variable hydraulic resistors at different pressure medium flows.

When assuming now—in accordance with the representation in FIG. 4—that the flow rate through the hydraulic motor 1 is substantially higher than through the hydraulic motor 1', a pressure loss accordingly manifests at the hydraulic motor 1' having a lower flow rate according to the characteristic line of FIG. 2, which is also represented in FIG. 5 (flatter characteristic line). In other words, the back pressure manifesting in the range between the inlet of the variable resistor 6' and the low-pressure port of the hydraulic motor 1' is lower than the one that would manifest in the corresponding range of the hydraulic motor 1 if the pilot line 22 were shut off. The variable resistor 6 associated to the hydraulic motor 1 is subjected to a higher flow rate, so that the pressure loss across the resistor 6 is higher, and thus the pressure on the meter-out 4 side is higher than the corresponding pressure on the meter-out 4' side. This higher pressure is reported via the control line 10 in the pilot line 22. Accordingly a higher pressure is present at the inlet of the check valve 14' than on the meter-out 4' side. The check valve 14 opens, and the pressure in the pilot line 22 is reduced to the pressure on the meter-out 4' side. Owing to this reduced pressure in the pilot line 22, the pressure acting in the opening direction of the variable resistor 6 is lowered, so that the latter is taken by the force of the spring 8 into a position of through flow that is essentially determined by the pressure on the meter-out 4' side of the hydraulic motor 1', i.e., by the lowest pressure (back pressure) of the system. The variable resistor 6 is thus in accordance with this lowest pressure taken into a position in which a higher back pressure is generated on the meter-out 4 side when the pilot line 22 is shut off, so that the hydraulic motor 1 is decelerated, and the slip at this driven wheel is reduced.

In accordance with the invention, the flow rate in the branches having a higher flow rate is thus determined by the back pressure of the hydraulic motor 1' having the lowest flow, with this lowest pressure acting through the check valves 14 in the pilot line 22. The system does, however, also work without the check valves 14, for in this case a "medium" pressure then builds up in the pilot line 22 at the respective hydraulic motors as a function of the back pressures, whereby an increased back pressure may be built up in the hydraulic motors having a higher flow rate, whereby the associated hydraulic motors are decelerated.

FIG. 5 shows the characteristic lines of such a system. As was already mentioned in the preceding, the characteristic line of the hydraulic motor 1 having the lowest flow rate has the shape already represented in FIG. 2—the pressure rise is approximately linear with the flow. In accordance with the above explanations, the effective cross-section of flow of the hydraulic resistor 6 of the hydraulic motor 1 having the higher flow rate is set, in dependence on the back pressure at the other hydraulic motor 1', to a constant value having a smaller cross-section of flow, than would manifest when the pilot line 22 is shut off. Owing to this constant, lower cross-section of flow, the characteristic line of the resistor 6 is substantially the same as in the case of a resistor having a non-variable cross-section of flow (bold, steeply rising line in FIG. 5).

Figure 6:
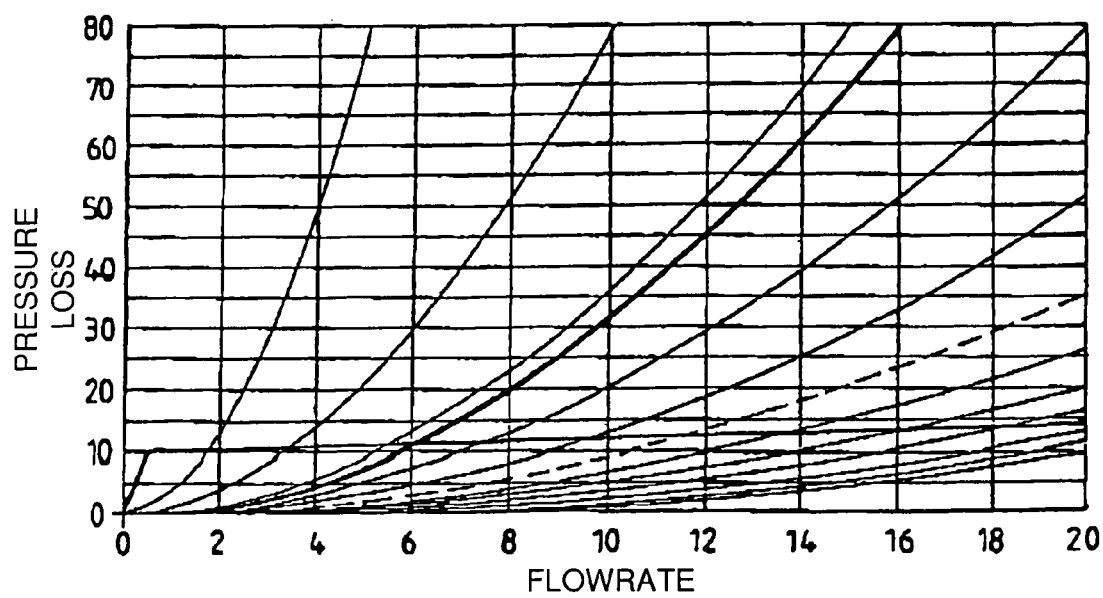
FIG. 6 shows the shift of the characteristic lines according to FIG. 5 for changes of the pressure range.

In FIG. 6 the characteristic lines for higher pressure ranges are represented, wherein the characteristic line of the hydraulic resistor 6 having a higher flow rate is plotted as a dashed line in FIG. 6. In accordance with this representation, in higher pressure ranges the back pressure generated at the inlet of the variable resistor 6 (variable hydraulic resistor having a higher flow rate) correspondingly is substantially higher (bold line in FIG. 6) than the back pressure generated in lower pressure ranges (dashed line).

Figure 7:
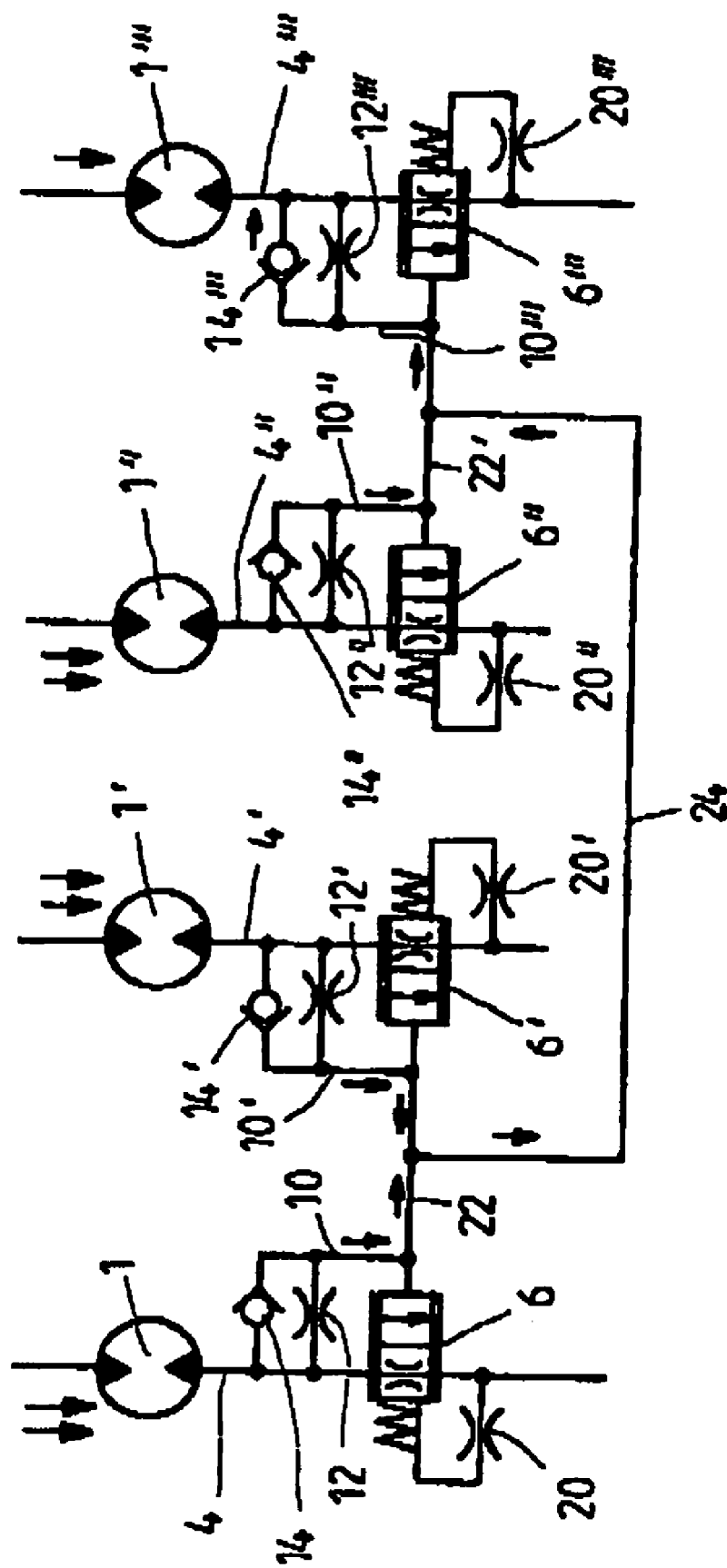
FIG. 7 shows a drive mechanism including four basic components according to FIG. 1.

In the practical example of a hydrostatic traveling mechanism as represented in FIG. 7, four hydraulic motors 1, 1', 1' and 1' are supplied with pressure medium via a common hydraulic pump. In the meter-out 4, 4', 4', 4' of each hydraulic motor 1 (1' . . . ) a respective valve assembly according to the preceding explanations having a variable hydraulic resistor 6 (6', . . . ), a throttle 12 (12', . . . ), a check valve 14 (14', . . . ) as well as the control line 10 (10', . . . ) and the other above described components is formed. The control lines 10, 10' of the resistors 6, 6' are connected with each other via the pilot line 22, and the control lines 10' and 10' via a pilot line 22'. These two pilot lines 22, 22' in turn communicate with each other via a pilot passage 24, so that when the pilot lines 22, 22' are open and the pilot passage 24 is open, the control surfaces of the hydraulic resistors acting in the opening direction are subjected to a same pressure.

Now a case is assumed in which the flow through the hydraulic motors 1, 1', 1' is higher than the flow through the hydraulic motor 1'. Owing to this comparatively low flow, the pressure drop across the variable resistor 6' is low, so that on the meter-out line 4' a lower back pressure manifests. Owing to the higher flow on the meter-out lines 4, 4' and 4', the associated variable resistors 6, 6' and 6' would be shifted into a position having a larger open cross-section than the resistor 6'. This higher pressure is, however, reported via the pilot line 22, the pilot passage 24 and the pilot line 22' to the inlet of the check valve 14'. Owing to the relatively low pressure on the meter-out 4' side, the check valve 14' is opened, and the pressure in the pilot lines 22, 22' is lowered substantially to the pressure on the meter-out 4' side. Correspondingly, the variable resistors 6, 6', 6' are taken into a position having a smaller open cross-section, so that on the meter-out 4, 4', 4' side a higher back pressure builds up, and the associated hydraulic motors 1, 1' and 1' are decelerated. Accordingly, in this system having a multiplicity of hydraulic motors 1, 1', 1', 1', the open cross-section of the variable resistors 6 having a higher flow through them as a function of the back pressure at the hydraulic motor 1' is also set to minimum flow. If one were to omit the check valves 4 (4', . . . ), then again a "medium" pressure would manifest in the pilot lines 22, 22', so that the hydraulic motors would also accordingly be decelerated concurrently with a higher flow rate.

Figure 8:
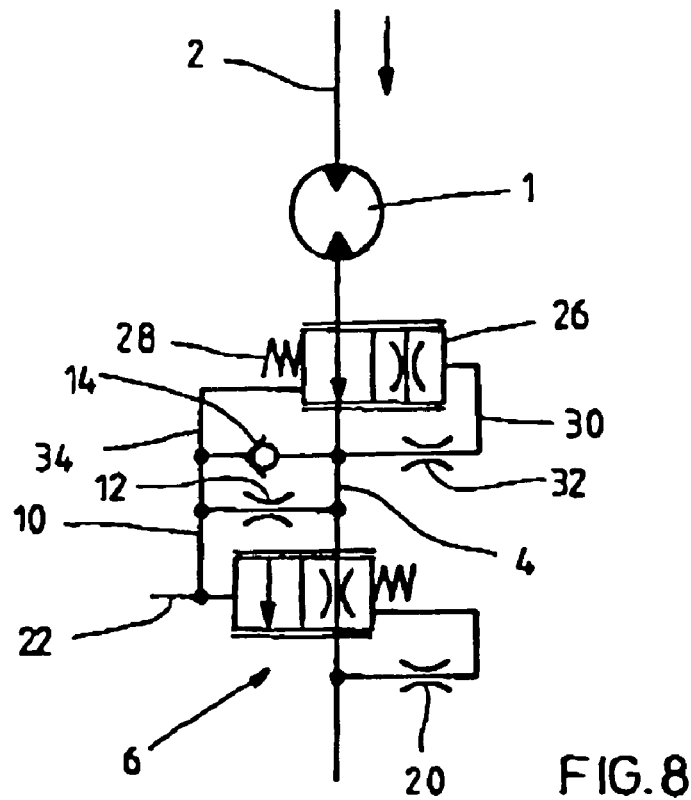
FIG. 8 shows a variant of the basic component according to FIG. 1 with additional throttle means.

The effect of the valve assembly in accordance with the invention may be further improved if an additional throttle means 26 according to FIG. 8 is provided on the meter-in or meter-out side of the hydraulic motor 1. A valve body of this throttle means 26 is biased by a compression spring 28 into a position of maximum cross-section of flow. In this basic position the pressure loss across the throttle means 26 is minimum. The latter is subjected to the pressure on the meter-out side, i.e., at the entrance of the variable resistor 6, that is tapped via a throttle line 30 including a throttle 32, in a direction of a lower cross-section of flow. The spring chamber of the throttle means 26 is connected via a control line portion 34 with the control line 10 and thus with the pilot line 22. In the event of buildup of a comparatively high back pressure on the meter-out 4 side (with the flow through hydraulic motor 1 being higher than through the other hydraulic motors; variable resistor 6 set by the pilot pressure to a substantially constant, smaller cross-section of flow), the throttle means 26 is shifted in the direction of the reduced cross-section of flow, so that an additional back pressure decelerating the hydraulic motor 1 is built up. The throttle means 26 associated to the hydraulic motor having a low flow is—owing to the lower back pressure on the meter-out 4 side—set to its position having a maximum open cross-section in which the pressure loss is minimum.

Figure 9:
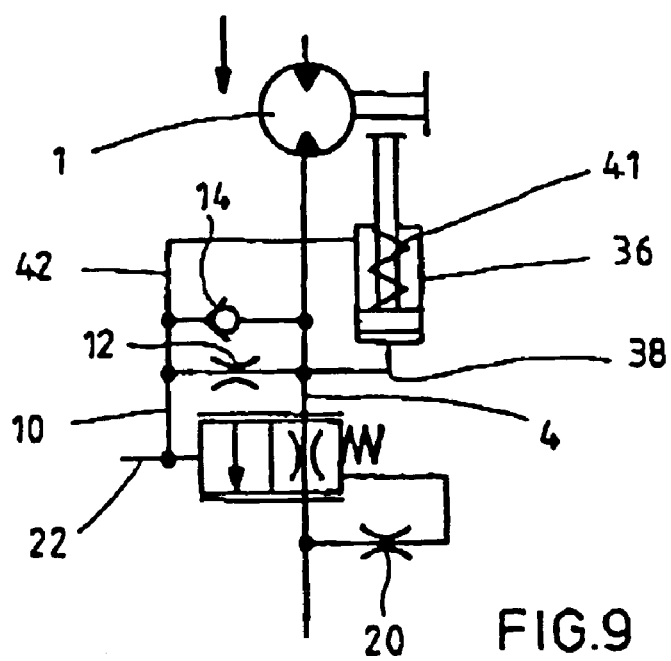
FIG. 9 shows a variant of the basic component of FIG. 1 with brake means.

As was already mentioned, the throttle means 26 may be arranged both on the meter-out 4 side and also on the meter-in 2 side. Instead of, or in addition to, the throttle means 26 a dynamic-action brake 36 according to FIG. 9 may also be used for decelerating the hydraulic motor 1. A spring chamber 41 of the brake 36 is connected via a reset line 42 with the control line 10 and thus with the pilot line 22. This brake 36 is actuated via the pilot or control pressure tapped via a brake line from the meter-out 4 side. In other words, this brake 36 engages as a result of the back pressure building up in the hydraulic motor 1 having a higher flow owing to the control in accordance with the invention, and additionally decelerates the hydraulic motor 1.

Figure 10:
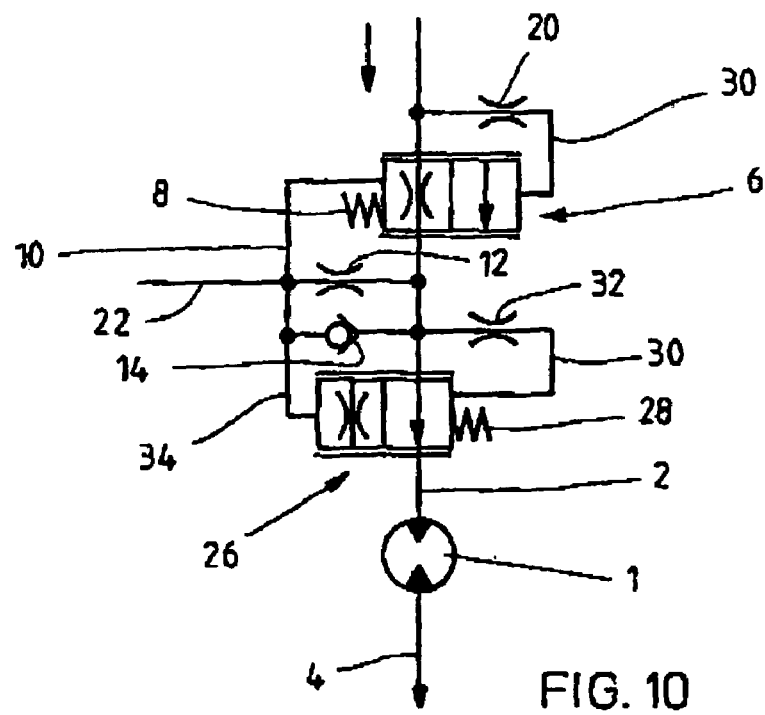
FIG. 10 shows an arrangement according to FIG. 8 on the meter-in side of a hydraulic motor.

In FIG. 10 a variant is represented wherein the variable resistor 6 is arranged on the meter-in 2 side of the hydraulic motor 1, with a throttle means 26 as already explained in the practical example according to FIG. 8 being provided between the variable resistor 6 and the hydraulic motor 1. The variable resistor 6 is—just like in the above described versions— biased through the spring 8 into its position of smaller open cross-section and is at the same time acted on in the same direction by the pressure in the control line 10. In the opposite direction, i.e., in the direction of the increased open cross-section, the valve body of the variable resistor 6 is subjected to the pressure upstream from the variable resistor 6 via the throttle line 30. The check valve 14 then opens in the direction towards the pilot line 22 connected to the control line 10, so that correspondingly the highest pressure manifesting at the outlet of a variable resistor 6 prevails in the pilot line 22. This highest pressure is correspondingly caused by the lowest pressure medium flow rate, for in this case the least pressure drop across the variable resistor occurs.

The throttle means 26 correspondingly is in this case biased in the direction of decreased open cross-section by the pressure tapped in the pilot line 22 via the control line portion 34, and in the direction of increased open cross-section by the pressure at the exit from the variable resistor 6 tapped via the throttle line 30. If, now, the system represented in FIG. 10 having meter-in control is used for supplying a plurality of hydraulic motors 1 through a common hydraulic pump (cf. FIGS. 4 and 7), then the hydraulic motor having the lowest flow determines the pressure in the pilot line 22, for in this case in the range between the variable resistor 6 and the throttle means 26 the highest pressure is reported via the check valve 14 in the pilot line 22 as a result of the low flow. Correspondingly the variable resistors 6 of the hydraulic motors 1 having a higher flow are shifted into a throttling position having a constant, reduced cross-section than would be the case with a shut-off pilot line 22. In addition the pressure medium flow rate across the throttle means 26 is throttled, for the latter is shifted by the higher pressure in the pilot line 22 towards a reduced open cross-section—the hydraulic motors 1 having a higher flow are correspondingly decelerated, and the slip at the associated driven wheels is reduced.

In the above practical examples, the control pressure was tapped on the meter-in side or on the meter-out side of the hydraulic motor 1 for actuation of the variable resistor 6. In the practical example represented in FIG. 11, the control pressure is generated by a secondary engine 40 driven by the associated hydraulic motor 1. Depending on the rotational speed of the hydraulic motor 1, control oil is supplied via a supply line 42 to the secondary engine 40, the low-pressure side of which is connected to a secondary engine meter-out 44. In the latter, the variable hydraulic resistor 6 is arranged, the valve body of which is biased by the spring 8 in the direction of the smallest cross-section of flow. The spring chamber and the outlet of the resistor 6 are connected via the line 18 and the damping throttle 20 with the meter-out 4 of the primary hydraulic motor 1, so that the control oil is returned after flowing through the resistor 6.

From the secondary engine meter-out 44 there branches the control line 10 that merges into the pilot line 22, through which the pressure prevailing in the secondary engine meter-out 44 is conducted as the control pressure to the control surface acting in the direction of the larger cross-section of flow. Parallel with the throttle 12 the check valve 14, through which the pilot line 22 may be connected with the secondary engine meter-out 44, is provided in the control line 10.

In the meter-out 4 of the hydraulic motor 1 the throttle means 26 is arranged, which is biased into its basic position of maximum open cross-section by the compression spring 28. The spring chamber of the compression spring 28 is moreover connected through the control line portion 34 with the pilot line 22. The throttle means 26 is subjected, in the direction of the minimum open cross-section, to the pressure in the throttle line 30 which corresponds to the pressure in the secondary engine meter-out 44. In other words, in this variant the meter-out of the hydraulic motor 1 is throttled by means of the throttle means 26, and thus a back pressure decelerating the hydraulic motor 1 is built up, while through the intermediary of the variable hydraulic resistor 6 a back pressure decelerating the secondary engine 40 is generated.

Figure 11:
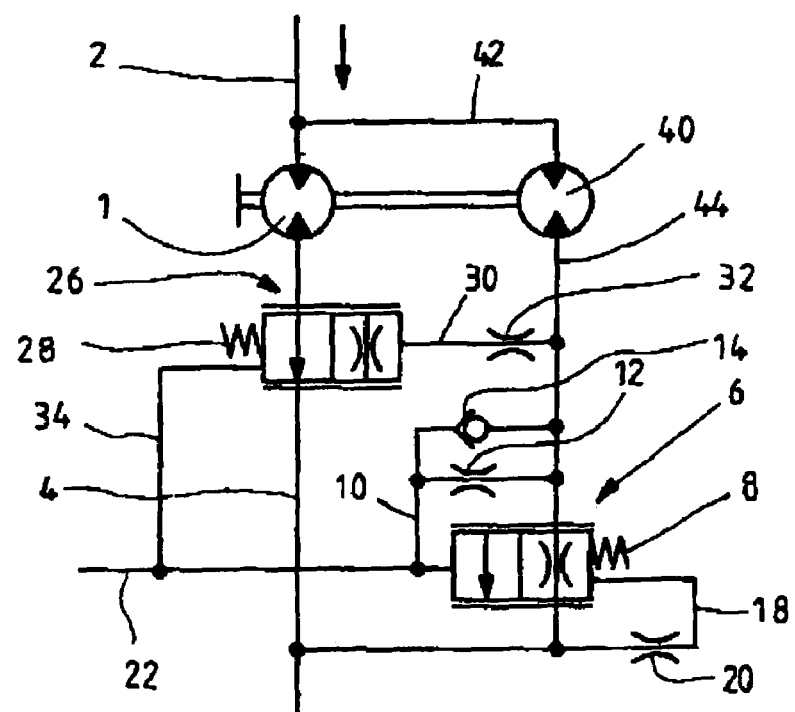
FIG. 11 shows a variant of the basic component according to FIG. 1, wherein a control oil flow is generated with the aid of a secondary engine.

For the case that several ones of the branches shown in FIG. 11 are supplied with pressure medium via a common hydraulic pump, the pressure in the common pilot line 22 is determined by the back pressure at the secondary engine 40 having the lowest flow rate, which correspondingly is associated to the hydraulic motor 1 having the lowest flow rate. The hydraulic resistors 6 and throttle means 26 of the other hydraulic motors 1, secondary engines 40 are in accordance with this low control pressure taken into a substantially constant position of flow, the effective diameter of which is smaller than in the case in which the pilot line 22 is shut off, and thus the cross-connection between the single branches would be interrupted—correspondingly the associated hydraulic motors are decelerated by the increased back pressure generated, and the slip of the driven wheels is reduced.

In the above described practical example only a small portion of the pressure medium is used for generating the control pressure in the pilot line, so that the power loss in the main branch is low. The primary flow rate across the hydraulic motor 1 is throttled only when a slip is detected and the flow rate thus becomes excessively high.

Particularly in arrangements where the above described valves (variable hydraulic resistor 6 and throttle means 26) are arranged on the meter-in side of the hydraulic motor, it may be necessary to provide an anti-cavitation valve in the range of the meter-in port of the engine. This anti-cavitation valve supplies the engine with pressure medium when it is driven by an external load such as, e.g., when the vehicle travels downhill, whereby cavitation phenomena are prevented.

It is one essential advantage of the above described components that these may be arranged both on the meter-in side and also on the meter-out side without major modifications, and subsequent fitting of already existing systems is also possible. The solution in accordance with the invention moreover permits a parallel arrangement of the motors, with at least one variable hydraulic resistor according to the preceding description and optionally a throttle means being associated to each one of the hydraulic motors in the system, so that in practice an unlimited number of engines may be controlled.

The pressure losses of the arrangement in accordance with the invention are minimum due to the absence of stationary orifices in the pressure medium main flow path. Particularly at low volume rates the responsiveness of the system is optimum, with good startup behavior and a lower power loss at high speeds of the hydraulic motor being ensured. The system has a very simple construction and is permanently active without any additional external input or control. The employed hydraulic components may be integrated into the engine block in an extremely compact manner, or may be provided with an additional housing. The drive mechanism may be used with minimum adaptations in traveling mechanisms having different displacement volumes and wheel sizes, wherein radial piston engines having two supplying directions may also be used.

A drive mechanism is disclosed which includes a hydraulic pump whereby at least two hydraulic motors may be supplied with pressure medium. The drive mechanism in accordance with the invention has on the meter-in side or on the meter-out side of each hydraulic motor a variable hydraulic resistor that is biased into a basic position of minimum open cross-section and may be subjected to a control pressure in a direction of increased open cross-section. This control pressure is dependent on the pressure on the meter-in side or on the meter-out side of the hydraulic motor.

The invention claimed is:

1. A drive mechanism comprising:
   at least two hydraulic motors which may be supplied with a pressure medium,
   wherein a flow valve for throttling the pressure medium or control oil flow is associated to a meter-in or meter-out side of each hydraulic engine motor,
   wherein each flow valve is a variable hydraulic resistor having a maximum and a minimum open cross-section,
   wherein a valve body of the resistor is biased into its basic position of minimum open cross-section by a spring and may be subjected to a control pressure in a direction of increased or decreased open cross-section,
   wherein the control pressure is dependent on the pressure on the meter-in or meter-out side of a hydraulic engine motor, characterized in that control lines conducting the control pressure are connected to a line section between the hydraulic motor and the respective flow valve and interconnected via a pilot line, and
   wherein in each control line a check valve is provided which opens in such a way that the pressure in the pilot line may approximately be set to the one control pressure at the hydraulic motor having the lowest pressure medium flow rate.

2. The drive mechanism in accordance with claim 1, wherein the variable hydraulic resistor includes a continuously adjustable throttle valve having in one end position a minimum cross-section of flow and in the other end position a maximum cross-section of flow.

3. The drive mechanism according to claim 1, wherein the variable hydraulic resistor is arranged on the meter-out side of the hydraulic motor and may be subjected to the action of the spring in the direction of reduced cross-section of flow, and to the back pressure on the meter-out side of the hydraulic motor in the direction of increased open cross-section via control line.

4. The drive mechanism according to claim 1, wherein the variable hydraulic resistor is arranged on the meter-in aside of the hydraulic motor and is subjected to the action of the spring in the direction of reduced cross-section of flow via the control pressure on the meter-in side of the hydraulic engine motor that is tapped via the control line, and to the pressure upstream from the variable resistor in the direction of increased open cross-section.

5. The drive mechanism according to claim 4, wherein a throttle means is arranged on the meter-in or meter-out side of the hydraulic motor and is subjected to the control pressure in a direction of reduced open cross-section.

6. The drive mechanism according to claim 1, wherein throttles connected in parallel with the check valves are arranged in the control lines.

7. The drive mechanism according to claim 1, further comprising:
   another variable throttle means subjected to the control pressure in the closing direction.

8. The drive mechanism according to claim 7, wherein the throttle means is arranged on the meter-in or meter-out side of the hydraulic motor and is subjected to the control pressure in a direction of reduced open cross-section.

9. The drive mechanism according to claim 1, including a brake that acts on the hydraulic motor and may be influenced by the control pressure.

10. The drive mechanism according to claim 1, wherein the hydraulic motor drives a secondary engine, so that a control oil volume may be supplied to the variable hydraulic resistor and back from there on the meter-out or meter-in line and wherein the control pressure acting on the variable hydraulic resistor is tapped in accordance with this control oil flow across the control line.

* * * * *